(12) United States Patent
Lavoie

(10) Patent No.: US 9,714,051 B2
(45) Date of Patent: Jul. 25, 2017

(54) PARKING FEATURE MULTI-FUNCTION TILT KNOB

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/859,551

(22) Filed: Sep. 21, 2015

(65) Prior Publication Data

US 2017/0080974 A1    Mar. 23, 2017

(51) Int. Cl.
| | | |
|---|---|---|
| *B62D 13/06* | (2006.01) | |
| *B62D 15/02* | (2006.01) | |
| *B60K 37/02* | (2006.01) | |

(52) U.S. Cl.
CPC ......... *B62D 15/028* (2013.01); *B60K 37/02* (2013.01); *B62D 15/0285* (2013.01)

(58) Field of Classification Search
CPC combination set(s) only.
See application file for complete search history.

(56) References Cited

U.S. PATENT DOCUMENTS

| | | |
|---|---|---|
| 3,944,972 A | 3/1976 | Chandler |
| 4,320,267 A | 3/1982 | Greve et al. |
| 4,518,044 A | 5/1985 | Wiegardt et al. |
| 4,848,499 A | 7/1989 | Martinet et al. |
| 4,947,097 A | 8/1990 | Tao |
| 5,261,495 A | 11/1993 | Szymczak |
| 5,270,689 A | 12/1993 | Hermann |
| 5,313,389 A | 5/1994 | Yasui |
| 5,359,165 A | 10/1994 | Leveque et al. |
| 5,430,261 A | 7/1995 | Malone |
| 5,436,413 A | 7/1995 | Katakami |
| 5,957,232 A | 9/1999 | Shimizu et al. |
| 6,601,386 B1 | 8/2003 | Hori et al. |
| 6,636,197 B1 | 10/2003 | Goldenberg et al. |
| 6,750,406 B2 | 6/2004 | Komatsu et al. |

(Continued)

FOREIGN PATENT DOCUMENTS

| | | |
|---|---|---|
| DE | 3923676 A1 | 1/1991 |
| DE | 3931518 A1 | 4/1991 |

(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

*Primary Examiner* — Edward J Pipala
(74) *Attorney, Agent, or Firm* — Raymond Coppiellie; Price Heneveld LLP

(57) ABSTRACT

A control system for a vehicle includes an input including a rotatable rotary element and a controller. The controller executes a trailer backup assist mode including interpreting a first instantaneous position of the rotary element as a trailer control commanding position and generating a vehicle steering command based thereon. The controller also executes a parking assist mode including implementing a parking assist action corresponding to a second instantaneous position of the rotary element.

20 Claims, 9 Drawing Sheets

(56) References Cited

U.S. PATENT DOCUMENTS

| | | | |
|---|---|---|---|
| 7,038,667 B1 | 5/2006 | Vassallo et al. |
| 7,085,634 B2 | 8/2006 | Endo et al. |
| 7,191,865 B2 | 3/2007 | Spark |
| 7,225,891 B2 | 6/2007 | Gehring et al. |
| 7,255,061 B2 | 8/2007 | Denton |
| 7,309,075 B2 | 12/2007 | Ramsey et al. |
| 7,310,084 B2 | 12/2007 | Shitanaka et al. |
| 7,315,299 B2 | 1/2008 | Sunda et al. |
| 7,436,398 B2 | 10/2008 | Yuasa et al. |
| 7,550,686 B2 | 6/2009 | Girke et al. |
| 7,827,917 B1 | 11/2010 | Henderson |
| 7,837,004 B2 | 11/2010 | Yasuda |
| 8,036,792 B2 | 10/2011 | Dechamp |
| 8,138,865 B2 | 3/2012 | North et al. |
| 8,519,948 B2 | 8/2013 | Cruz-Hernandez et al. |
| 8,755,984 B2 | 6/2014 | Rupp et al. |
| 8,786,417 B2 | 7/2014 | Holmen et al. |
| 8,798,860 B2 | 8/2014 | Dechamp |
| 8,825,328 B2 | 9/2014 | Rupp et al. |
| 8,909,426 B2 | 12/2014 | Rhode et al. |
| 8,930,140 B2 | 1/2015 | Trombley et al. |
| 8,972,109 B2 | 3/2015 | Lavoie et al. |
| 9,102,271 B2 | 8/2015 | Trombley et al. |
| 9,108,598 B2 | 8/2015 | Headley |
| 9,132,856 B2 | 9/2015 | Shepard |
| 9,164,955 B2 | 10/2015 | Lavoie et al. |
| 9,187,124 B2 | 11/2015 | Trombley et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 9,434,414 B2 | 9/2016 | Lavoie |
| 2004/0093139 A1 | 5/2004 | Wildey et al. |
| 2004/0189595 A1 | 9/2004 | Yuasa et al. |
| 2005/0000738 A1 | 1/2005 | Gehring et al. |
| 2006/0092129 A1 | 5/2006 | Choquet et al. |
| 2007/0198190 A1 | 8/2007 | Bauer et al. |
| 2008/0030361 A1 | 2/2008 | Peissner et al. |
| 2008/0312792 A1 | 12/2008 | Dechamp |
| 2009/0101429 A1 | 4/2009 | Williams |
| 2009/0306854 A1 | 12/2009 | Dechamp |
| 2010/0063670 A1 | 3/2010 | Brzezinski et al. |
| 2010/0152989 A1 | 6/2010 | Smith et al. |
| 2010/0222964 A1 | 9/2010 | Dechamp |
| 2011/0149077 A1 | 6/2011 | Robert |
| 2011/0160956 A1 | 6/2011 | Chung et al. |
| 2012/0030626 A1 | 2/2012 | Hopkins et al. |
| 2012/0087480 A1 | 4/2012 | Yang et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2013/0006472 A1 | 1/2013 | McClain et al. |
| 2013/0024064 A1 | 1/2013 | Shepard |
| 2013/0158803 A1 | 6/2013 | Headley |
| 2013/0158863 A1 | 6/2013 | Skvarce et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0088797 A1 | 3/2014 | McClain et al. |
| 2014/0156148 A1 | 6/2014 | Kikuchi |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267868 A1 | 9/2014 | Mazzola et al. |
| 2014/0267869 A1 | 9/2014 | Sawa |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0057903 A1 | 2/2015 | Rhode et al. |
| 2015/0066296 A1 | 3/2015 | Trombley et al. |
| 2015/0070161 A1 | 3/2015 | Mizuno et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2016/0039456 A1 | 2/2016 | Lavoie et al. |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0229452 A1* | 8/2016 | Lavoie .............. B62D 15/027 |
| 2016/0280267 A1 | 9/2016 | Lavoie et al. |
| 2016/0304122 A1 | 10/2016 | Herzog et al. |

FOREIGN PATENT DOCUMENTS

| | | |
|---|---|---|
| DE | 9208595 U1 | 8/1992 |
| DE | 10154612 A1 | 5/2003 |
| DE | 102005043467 A1 | 3/2007 |
| DE | 102006002294 A1 | 7/2007 |
| DE | 102008004160 A1 | 8/2009 |
| DE | 102009012253 A1 | 9/2010 |
| DE | 102010021052 A1 | 11/2011 |
| DE | 102010029184 A1 | 11/2011 |
| EP | 0418653 A1 | 3/1991 |
| EP | 1653490 A1 | 5/2006 |
| EP | 1810913 A1 | 7/2007 |
| EP | 2388180 A2 | 11/2011 |
| EP | 1569073 B1 | 9/2014 |
| GB | 2398048 A | 8/2004 |
| GB | 2398049 A | 8/2004 |
| GB | 2398050 A | 8/2004 |
| JP | 2003045269 A | 2/2003 |
| JP | 2003175852 A | 6/2003 |
| JP | 2007186118 A | 7/2007 |
| KR | 20140105199 A | 9/2014 |
| WO | 0044605 A1 | 8/2000 |

* cited by examiner

PARKING FEATURE MULTI-FUNCTION TILT KNOB

FIELD OF THE INVENTION

The disclosures made herein relate generally to steering assist technologies in vehicles and, more particularly, to trailer backup assist system having a rotatable driver interface for controlling trailer path.

BACKGROUND OF THE INVENTION

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner, which can result in such systems having a fairly complex human machine interface (HMI) and vehicle/trailer position determination.

Therefore, an approach for backing a trailer that provides a simple human machine interface and that overcomes other shortcomings of known trailer backup assist systems would be advantageous, desirable and useful.

SUMMARY OF THE INVENTION

According to one aspect of the present invention, a control system for a vehicle includes an input including a rotatable rotary element and a controller. The controller executes a trailer backup assist mode including interpreting a first instantaneous position of the rotary element as a trailer control commanding position and generating a vehicle steering command based thereon. The controller also executes a parking assist mode including implementing a parking assist action corresponding to a second instantaneous position of the rotary element.

According to another aspect of the present invention, a vehicle includes a steering system, and an input including a rotatable element. The vehicle further includes a trailer backup assist system determining a first instantaneous position of the rotary element and executing a trailer backup assist mode including interpreting the first instantaneous position as a trailer control commanding position and outputting a steering command based thereon to the steering system. The vehicle still further includes a park assist system determining a second instantaneous position of the rotary element and implementing a parking assist action corresponding to the second instantaneous position including controlling the steering system.

According to another aspect of the present invention, a method for controlling a vehicle includes receiving a first mode input and determining a first instantaneous position of a rotary element within the vehicle. When the first mode input is a backup assist initiation, the method includes interpreting the first instantaneous position as a trailer control position and outputting a corresponding steering command to a vehicle steering system. When the first mode input is a park assist initiation, the method includes implementing a parking action corresponding to the first instantaneous position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
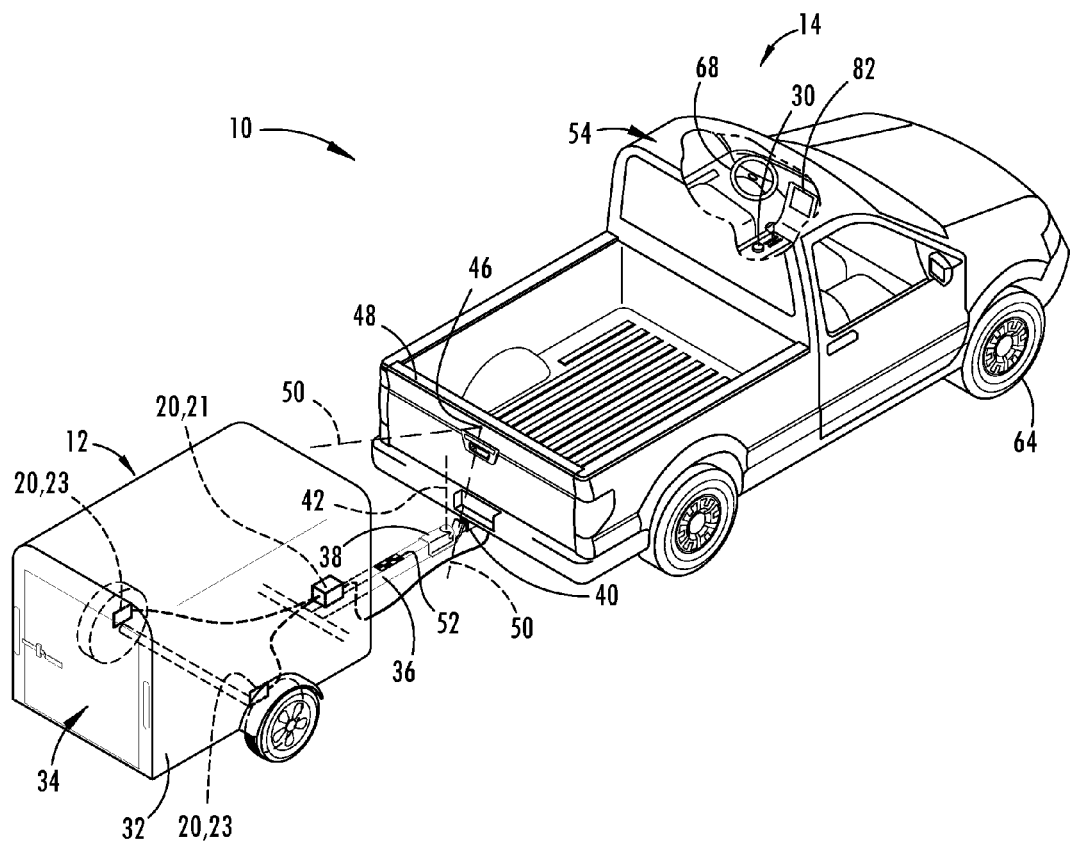
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-15, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 is implemented by a control system of vehicle 14 that includes an interface 212, (as shown in FIG. 8) including a rotatable rotary element 232 and a controller (such as controller 28 in FIG. 2). The controller executes a trailer backup assist mode including interpreting a first instantaneous position of the rotary element 232 as a trailer control commanding position and generating a vehicle steering command based thereon. The controller also executes a parking assist mode including implementing a parking assist action corresponding to a second instantaneous position of the rotary element 232.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilizes processed signals received outside of the sensor system 16, including standard signals from the brake control system 72 and the power assist steering system 62, such as vehicle yaw rate $\omega_1$, vehicle speed $v_1$, and steering angle $\delta$, to estimate the trailer hitch angle $\gamma$, trailer speed, and related trailer parameters. As described in more detail below, the controller 28 may estimate the hitch angle $\gamma$ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
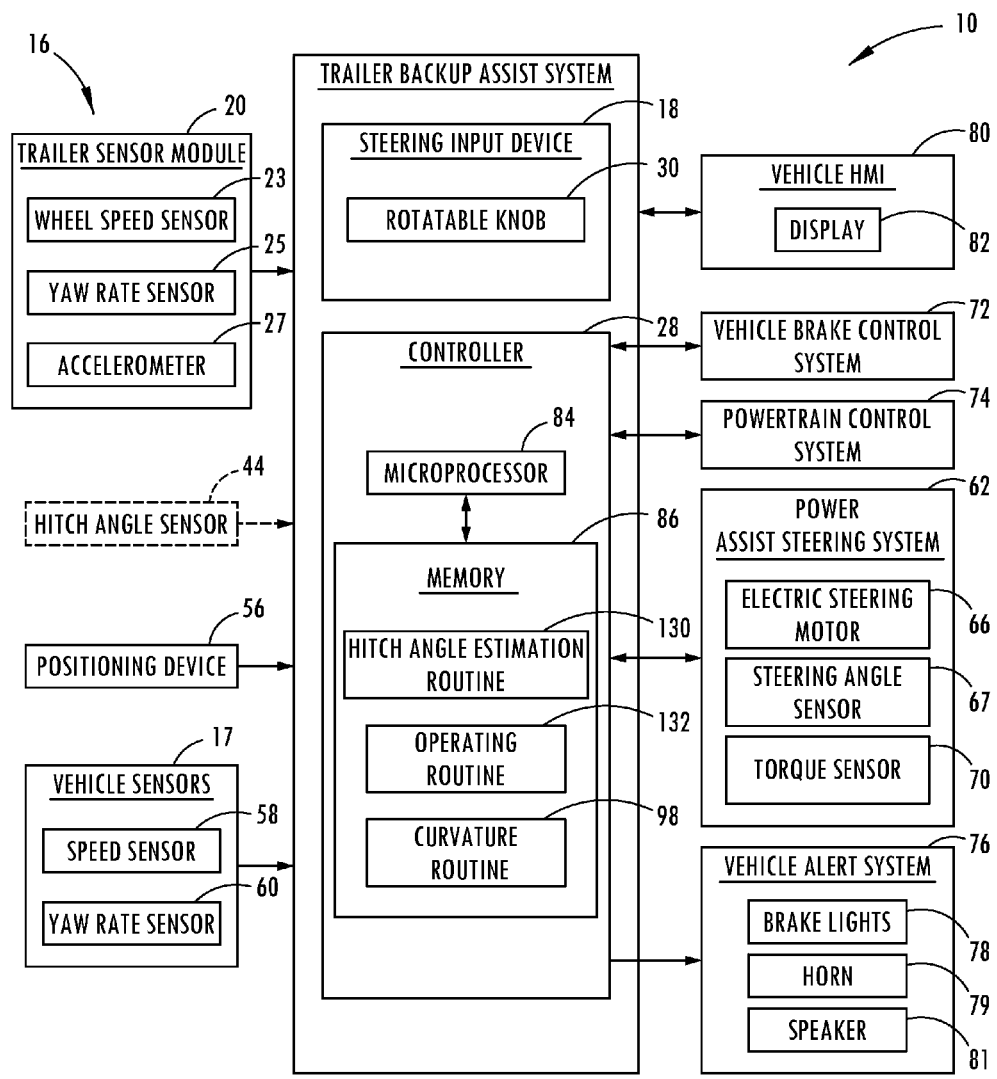
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 is provided in dashed lines to illustrate that in some embodiments it may be omitted when the trailer sensor module 20 is provided. The illustrated embodiment of the trailer backup assist system 10 receives vehicle and trailer status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle $\gamma$. The positioning device 56 may additionally or alternatively include a dead reckoning system for determining the coordinate location of the vehicle 14 and the trailer 12 within a localized coordinate system based at least on vehicle speed, steering angle, and hitch angle $\gamma$. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle $\gamma$, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
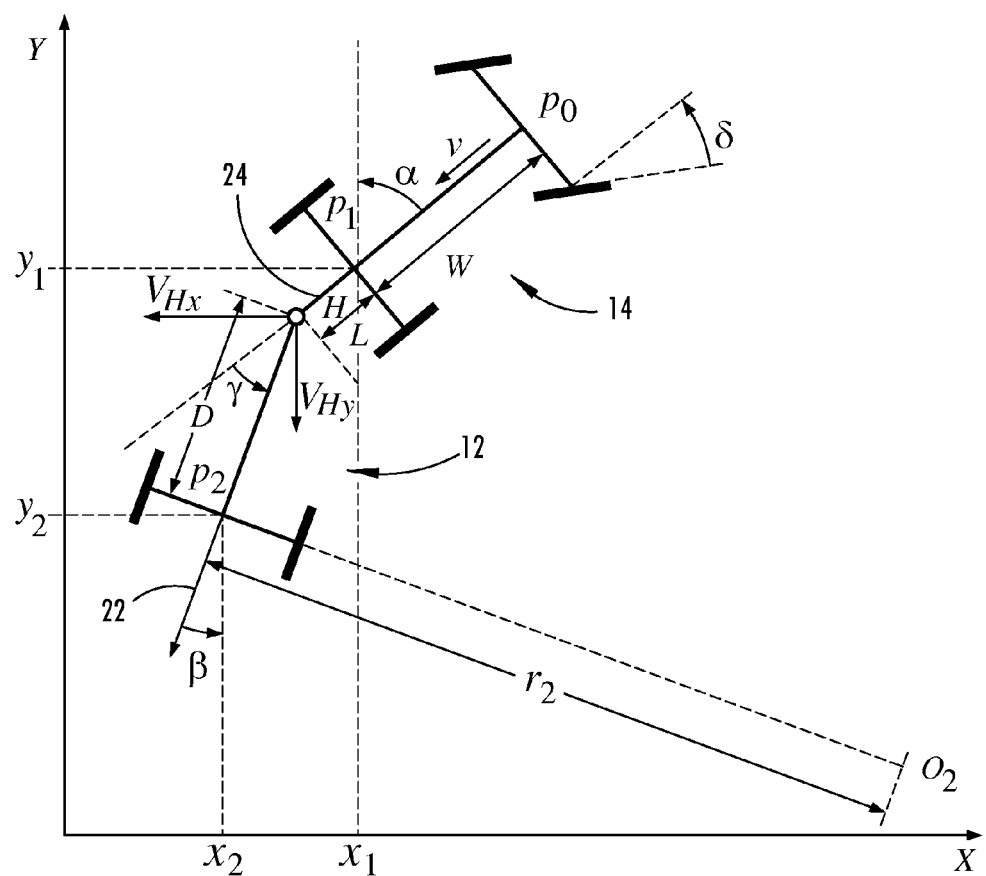
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
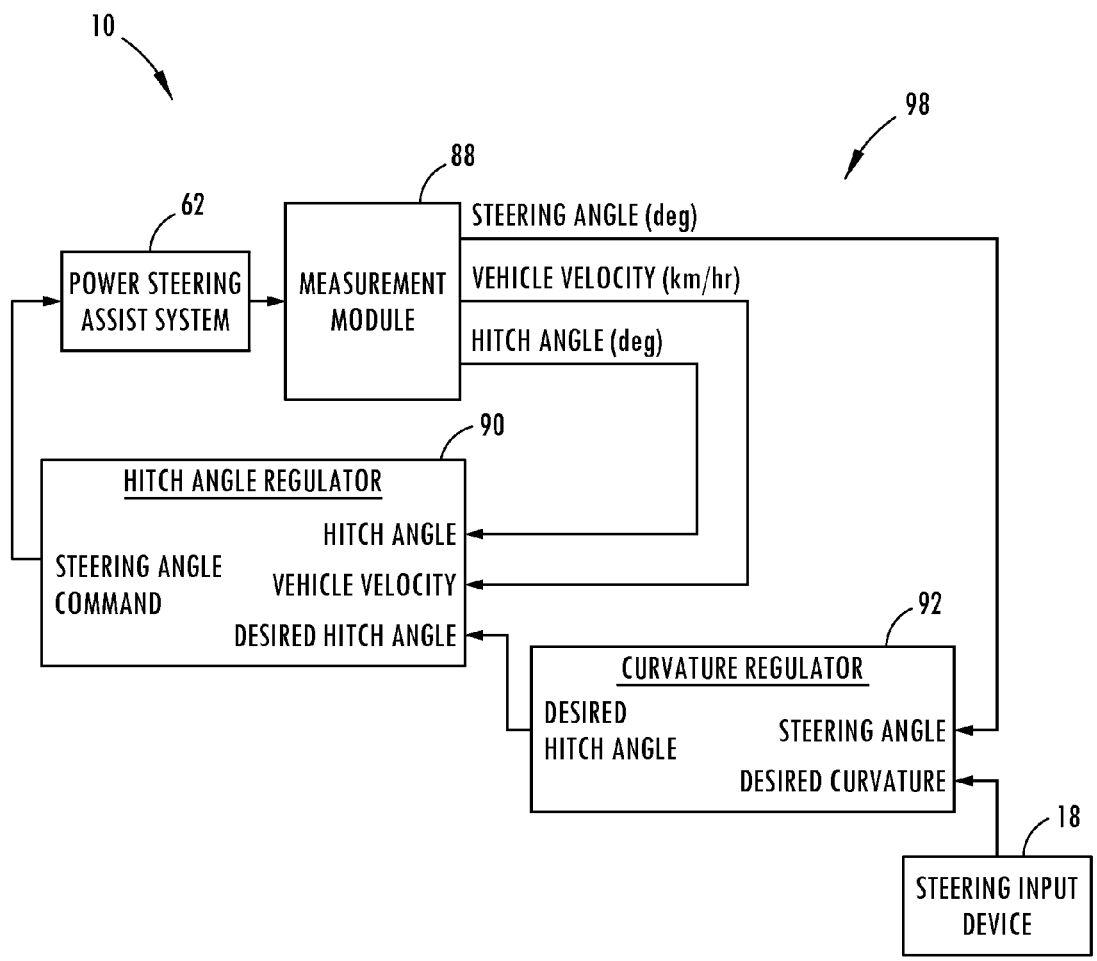
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where,
$\kappa_2$ represents the desired curvature of the trailer 12 or $1/r_2$ as shown in FIG. 3;
$\delta$ represents the steering angle;
L represents the distance from the rear axle of the vehicle 14 to the hitch pivot point;
D represents the distance from the hitch pivot point to the axle of the trailer 12; and
W represents the distance from the rear axle to the front axle of the vehicle 14.

The output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

The feedback control law, $g(u, \gamma, v)$, is implemented with a proportional integral (PI) controller, whereby the integral portion substantially eliminates steady-state tracking error. More specifically, the control system illustrated in FIG. 5 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\delta$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller or otherwise determined by the trailer backup assist system 10, as disclosed in greater detail herein.

Figure 5:
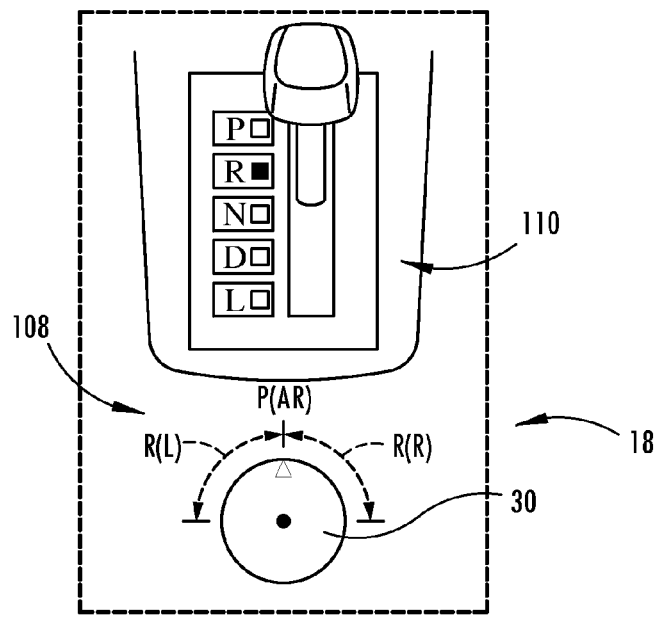
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
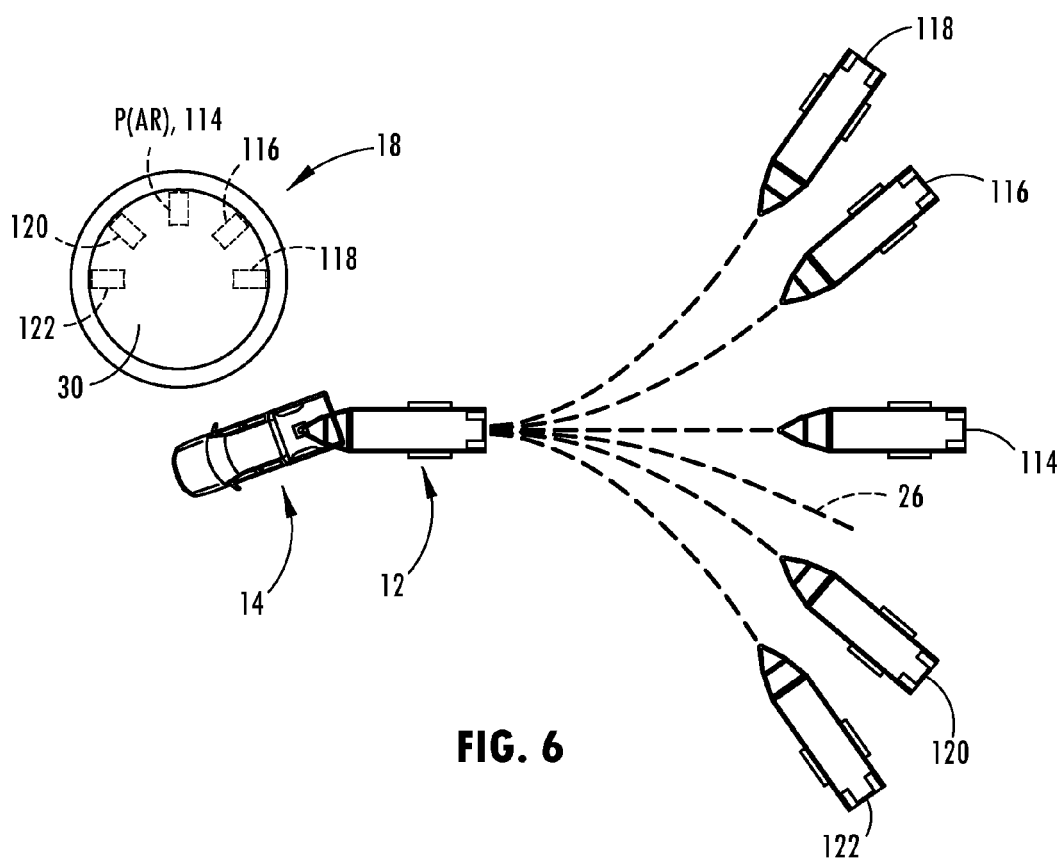
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIG. 6, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a torque that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR), which itself may correspond to a zero-curvature command 26. It is also contemplated that the rate of rotation of the rotatable knob 30 may also be used to determine the desired curvature 26 output to the controller 28. The at-rest position P(AR) of the knob corresponds to a signal indicating that the vehicle 14 should be steered such that the trailer 12 is backed along a substantially straight backing path 214 (FIG. 6) zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 6, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Figure 7:
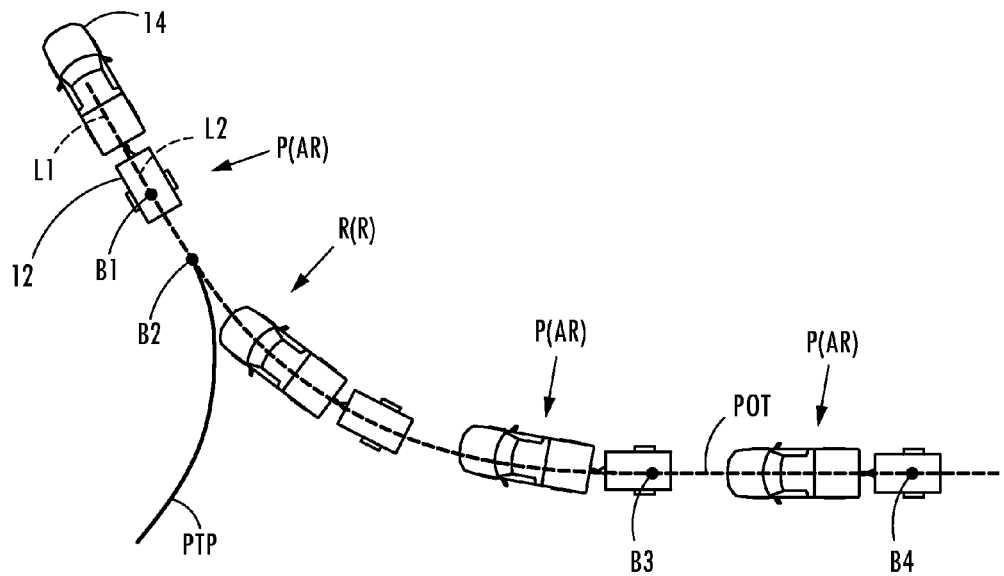
FIG. 7 is a schematic diagram showing a backup sequence of a vehicle and a trailer implementing various curvature selections with the trailer backup assist system, according to one embodiment.
Figure 8:
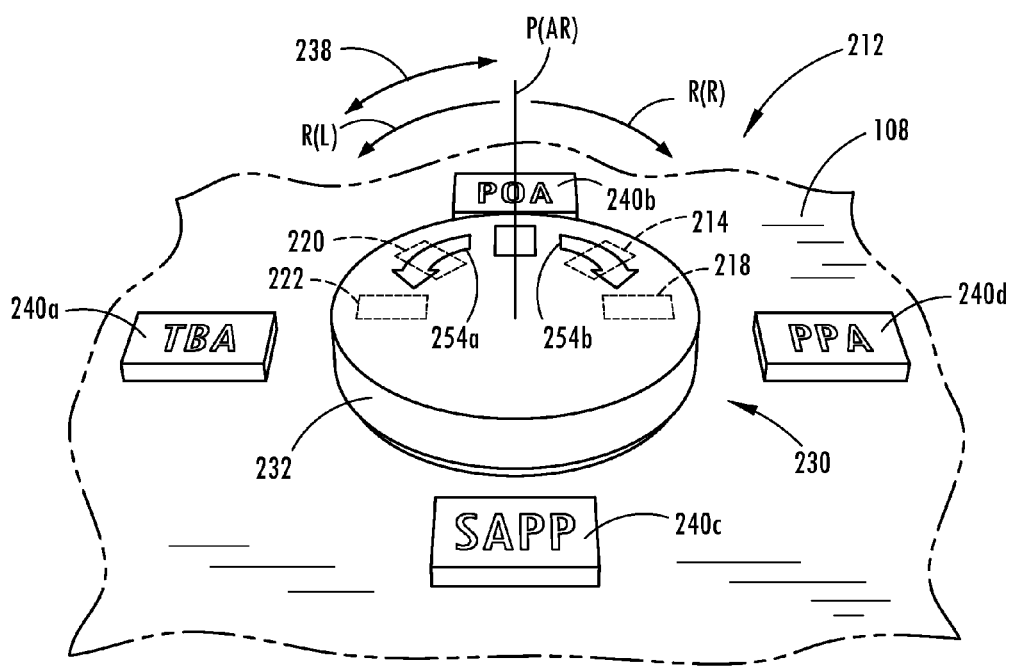
FIG. 8 is a perspective view of a variation of the rotatable knob for the trailer backup steering input apparatus of FIG. 5.

Referring to FIG. 7, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 230 is in/returned to the at-rest position P(AR).

In the embodiment illustrated in FIG. 7, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Turning now to FIG. 8, a further embodiment of a control knob 230 is illustrated and can be used to control vehicle 14 in reversing a trailer 12 based on a trailer control command, such as along a curvature path 26 by adjusting the desired trailer control command according to a particular, selectable command position. In an embodiment, the trailer control command may be a particular curvature path 26 according to the manner discussed above with respect to FIGS. 5-7. In particular, knob 230 can be used to adjust curvature path 26 by turning a control element 232 thereof, against a biasing torque, away from the at rest position P(AR) within either the left range of motion R(L) or a right range of motion R(R) extending away therefrom. Such a knob 230 can also be used in this manner to adjust a controlled hitch angle γ of trailer 12 relative to vehicle 14 using the same type of center-biased movement in connection with a backup assist system that is angle-based, rather than curvature based.

Figure 9:
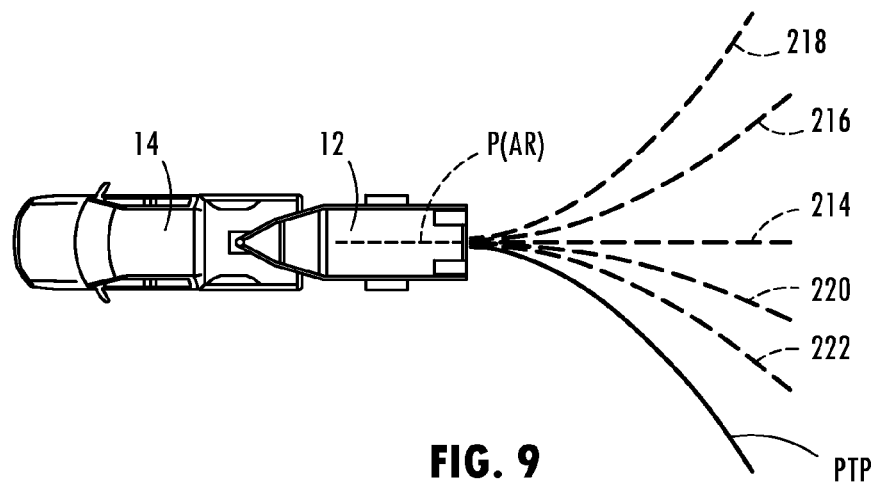
FIG. 9 is a schematic diagram showing a backup sequence of a vehicle and a trailer implementing various curvature selections with the trailer backup assist system.

With reference to FIG. 9, control of vehicle 14 in reversing trailer 12 using knob 230 is described. The illustrated embodiment of the control knob 230 is shown as being included within an interface 212 on console 108. The console 108 acts as a mounting structure and defines a surface that extends outwardly to surround knob 230 and includes a plurality of buttons 240a, 240b, 240c, and 240d surrounding knob 230 and corresponding to various operational modes of vehicle 14 that can be controlled, adjusted, or otherwise associated with knob 230 including the activation of a trailer backup assist mode, as described herein (additional modes being described below). The knob 230 and buttons 240a, 240b, 240c, and 240d may collectively be described as an input apparatus or interface 212. In this manner, button 240a may be depressed to send a trailer activation input or request to system 10, which, when received, directs system 10 to activate the curvature routine 98 for reversing of trailer 12 using vehicle 14.

Once curvature routine 98 is activated, control element 232 may be rotated away from the at rest position P(AR), such as within the left range of motion R(L) or the right range of motion R(R) to adjust the curvature command 26 away from center knob position 214 to an instantaneous one of the indicated ones of the rotated directional positions 216, 218, 220, and 222, which include various directional positions opposed about the at rest position P(AR). As shown in FIG. 8, the positions of control element 232 correspond to various adjusted curvature paths shown in FIG. 9. In this manner, and as further discussed above with reference to FIG. 6, controller 28 may accordingly control the steering of vehicle 14 to maintain trailer 12 along the desired path that corresponds to a particular instantaneous position of control element 232. In a further embodiment, an electromechanical element can be incorporated within knob 230, including in an operable relationship with control element 232, and can be used to control the movement modes of control element 232 with respect to body 234. In this manner, respective end points of rotation in the left range R(L) and the right range R(R) may be implemented and adjusted in real-time by electromechanical element to correspond to the calculated maximum curvature that can be commanded to keep hitch angle γ beneath the critical hitch angle $γ_c$, as calculated according to the procedure discussed above. An example of such an electromechanical element is described further in co-pending, commonly-assigned U.S. patent application Ser. No. 14/825,434, the entire disclosure of which is incorporated by references herein.

As discussed above, the use of a knob with a rotatable control element, such as knob 230 with control element 232 operably disposed thereon, can be used to control other systems or operational modes of vehicle 14. As illustrated in connection with the knob 230 illustrated in FIG. 8, and in FIGS. 12-14, knob 230 can be used to provide an input to a parking assist system that is also included within vehicle 14 and can make use of various sensors of vehicle 14, including those included in sensor system 16, to control the power assist steering system 62 (and, optionally, powertrain control system 74 and brake control system 72) to provide autonomous, semi-autonomous, or assisted parking functionality in at least one of various parking modes. It is noted that the parking assist mode, including the various sub-modes or schemes described below, for example, differs from the trailer backup assist mode in that it implements steering commands based on a path determined for entry to or exit from a parking space, rather than a curvature path or desired hitch angle. The parking assist mode may be configured to only operate when no trailer 12 is coupled with vehicle 14 and may further operate in both reversing and forward driving. In general, the parking assist functionality can be included within a single vehicle controller 28 that also implements the above-described curvature routine 98 for trailer backup assist functionality. Accordingly, in such an example, the parking assist "system" can overlap with the trailer backup assist system 10 and can be represented by additional programming or modules associated with controller 28. In such an example, knob 230, as well as buttons 240a, 240b, 240c, and 240d can be electrically coupled directly with controller 28 for selection or initiation of the various modes associated with knob 230 and use of knob 230 for control or entering of other inputs in such modes.

In another example, the parking assist system can be implemented from a controller that is separate from controller 28, in which case button 240a, for example, can be coupled with controller 28 and the remaining buttons 240b, 240c, 240d can be coupled with the parking assist controller, while knob 230 is coupled with both controllers. Alternatively, in such an example, a specific controller can be associated with interface 212 that can include the capability to determine a mode selection based on the use of buttons 240a, 240b, 240c, 240d and to determine an instantaneous position of control element 232. The input controller can, thusly communicate a specific actuation or initiation command to the relevant park assist or trailer backup assist controller, as well as the control element 232 position for use thereby.

Figure 10:
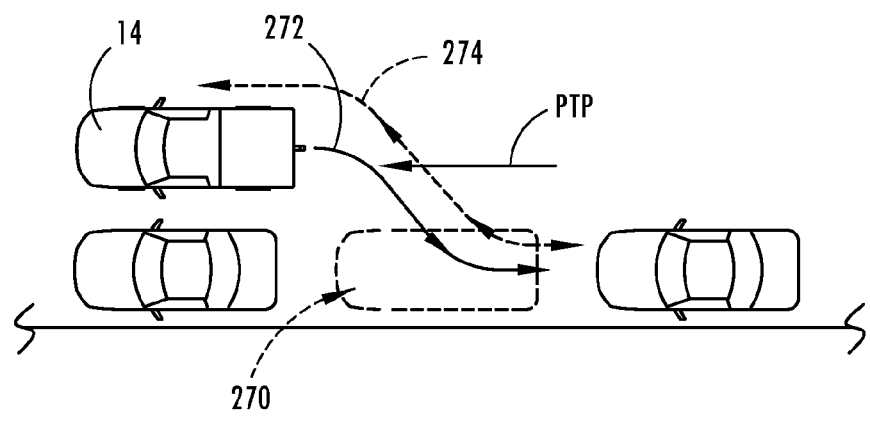
FIG. 10 is a schematic diagram showing the vehicle implementing various parking actions using a park assist system.

As illustrated in FIG. 10, the park-assist system can be capable of providing parallel-parking assistance. With reference to FIG. 8, a user can, upon positioning vehicle 14 in an appropriate location with respect to a parallel parking space 270, a user can depress button 240b to send a parallel park assist initiation signal to the appropriate controller. Upon receiving such a signal, the controller can await a selection of a side of vehicle 14 on which the parallel parking space 270 is located. An indication that such a selection is needed can be presented to user via HMI 80, for example. The selection of the appropriate vehicle 14 side (the driver side in the example depicted in FIG. 10) can be made by user by rotating control element 232 in the appropriate direction through a predetermined angle (e.g. about 10° or more), at which point the selection can be confirmed by indication on HMI 80, an audible indication, or by illumination of one of arrows 254a, 254b on the corresponding side of knob 230. In another example, the user can move a cursor (or appropriately-sized visual indicator) superimposed on an image of the surroundings of vehicle 14, which can be obtained, for example, by camera 46 and presented on HMI 80. Such a cursor or other indicator can be moved laterally in a manner that corresponds with the rotation/instantaneous position of control element 232. Selection can be confirmed by depressing knob 230 downwardly, for example.

After the appropriate side or position selection is made, the controller can implement the desired or available parallel parking assist mode. In one example, such a mode can be a semi-autonomous parallel parking mode, wherein the user retains control of the speed of vehicle by the throttle and brake (in a manner similar to the above-described trailer backup assist mode) with the vehicle 14 indicating the distance to adjacent vehicles using proximity alerting by audible signals or by visual indication on HMI, which can also be used to provide instructions ("reverse," "pull forward," etc.) to the driver of vehicle 14. Simultaneously, the park-assist system can control EPAS 62 such that vehicle 14 follows a parallel park-in path 272. In another mode, the parallel park assist system can implement a fully-autonomous parallel parking mode in which vehicle 14 can both control EPAS 62 as well as brake system 72 and powertrain control system 74 to control the speed of vehicle 14 while controlling EPAS 62 such that vehicle 14 follows the parallel park-in path 272. Other modes of parallel park assist are possible and can be implemented using knob 230 in a similar manner.

Interface 212 can also be used to select and implement a park-out assist mode, in which, in the example of FIG. 10, can include controlling EPAS 62 to appropriately steer vehicle 14 along park-out path 274. Referring back to FIG. 8, the park-out mode can be initiated by a user depressing button 240c, which communicates with the appropriate controller to activate the parking assist system or component. The user may then input the side of vehicle 14 to which the parking space 270 is to be exited by rotating control element 232 to such side, the system interpreting the instantaneous position of control element 232 during such turning as a selection of the corresponding vehicle side and implementing the park-out functionality accordingly. It is noted that such park-out functionality can be semi-autonomous or fully autonomous, as described above with respect to the parallel park assist functionality.

Figure 11:
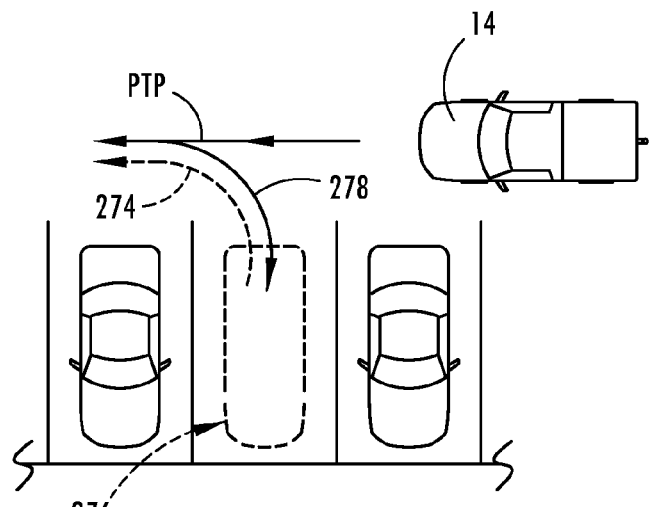
FIG. 11 is a further schematic diagram showing the vehicle implementing various additional parking actions using the park assist system.

In a similar manner, the park-assist system can be capable of providing perpendicular-parking assistance. With reference to FIG. 11, a user can, upon positioning vehicle 14 in an appropriate location with respect to a perpendicular parking space 276, the user can depress button 240d to send a perpendicular park assist initiation signal to the appropriate controller. Upon receiving such a signal, the controller can, in a manner similar to that of the parallel-park assist mode of FIG. 10, await a selection of a side of vehicle 14 on which the perpendicular parking space 276 is located. The selection of the appropriate vehicle 14 side (the driver side in the example depicted in FIG. 11) can be made, again, by user by rotating control element 232 in the appropriate direction through a predetermined angle or to a predetermined position, at which point the selection can be confirmed, for example, by indication on HMI 80.

After the appropriate side selection is made, the controller can implement the desired or available perpendicular parking assist mode, which, as discussed above, can be semi-autonomous, fully-autonomous, or the like. In either example, the park-assist system can control EPAS 62 such that vehicle 14 follows a perpendicular park-in path 278, while either the driver (with assistance from the system) or the system controls the vehicle speed. Other modes of perpendicular park assist are possible and can be implemented using knob 230 in a similar manner.

Interface 212 can also be used to select and implement the above park-out assist mode to assist in exiting the perpendicular parking space 276. As also shown in FIG. 11, this can include controlling EPAS 62 to appropriately steer vehicle 14 along park-out path 274. As discussed above, the park-out mode can be initiated by a user depressing button 240c (FIG. 8), which communicates with the appropriate controller to activate the parking assist system or component. The user may then input the side of vehicle 14 to which the parking space 270 is to be exited by rotating control element 232 to such side, the system interpreting the instantaneous position of control element 232 during such turning as a selection of the corresponding vehicle side and implementing the park-out functionality accordingly. It is noted that such park-out functionality can be semi-autonomous or fully autonomous, as described above with respect to the parallel park assist functionality. Additionally, in the park-out mode, the system can cause the respective one of the vehicle turn signals to activate on the side corresponding to the selected vehicle side for the park-out function.

Knob 230 may also provide for rotation and/or other movement thereof according to additional movement modes that may allow knob 230 to be used in connection with other inputs and systems within vehicle 14. Such movement modes may include the aforementioned biased rotation toward and away from the at rest position P(AR), which is shown in the present embodiment as being a rotation of an embodiment of control element 232 that is in the form of a generally circular or annular rotary element. As described in U.S. patent application Ser. No. 14/825,434, the various movement modes may be used to navigate within certain menus within a display, such as display 82 (which may be related to system 10, as well as additional vehicle systems and operation, such as climate-control, multimedia, etc.), as well as among menu items displayed thereon in certain instances and to input or confirm various information presented on display 82. This can be done in a first movement mode consisting of the above-mentioned biased movement of control element 232. Additionally or alternatively, such navigation and input can be done by free rotation 238 (FIG. 8) of control element 232 in, for example, the clockwise direction to increase the input value or in the anti-clockwise to decrease the value. In this manner, the user can confirm the entered value in menu item, for example, by depressing control element 232 or a centrally-disposed button thereof. Once the trailer backup assist mode has been activated, the movement mode of knob 230 may be switched into the aforementioned biased movement away from at rest position P(AR), for example, by control of an electromechanical element within knob 230. This can also be done upon entering either of the parking-assist modes, if desired.

Figure 12:
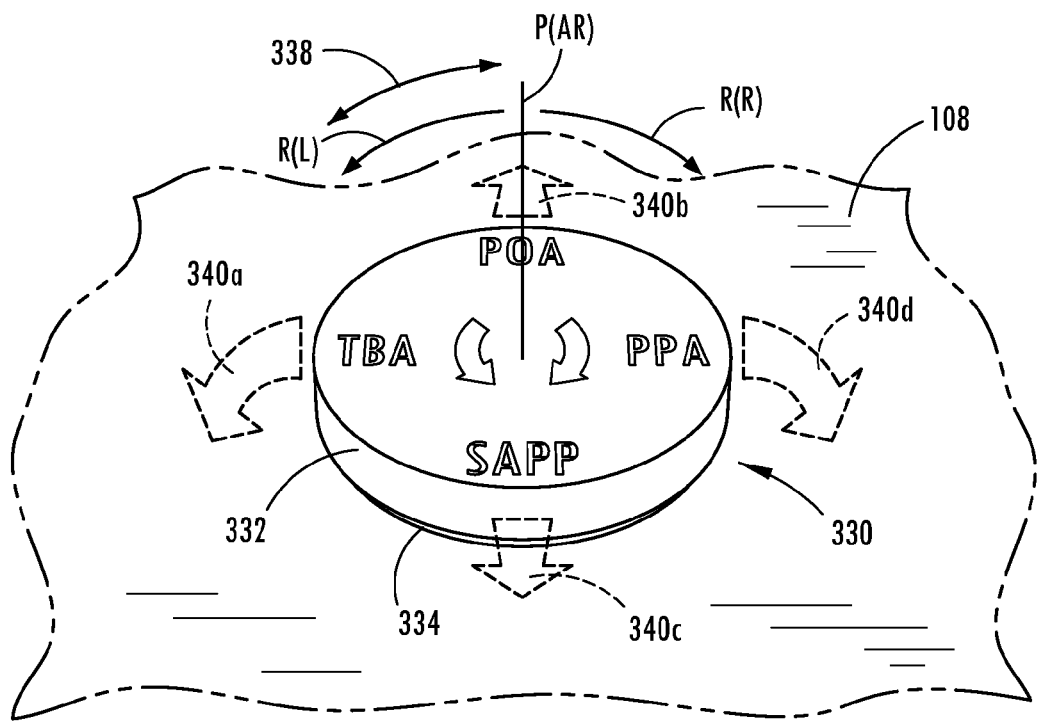
FIG. 12 is a further perspective view of a variation of the rotatable knob for the trailer backup steering input apparatus of FIG. 5
Figure 13:
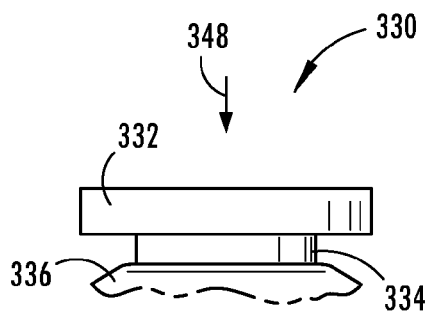
FIGS. 13 and 14 show the rotatable knob of FIG. 12 according to various movement modes for making various inputs and directional selections.
Figure 14:
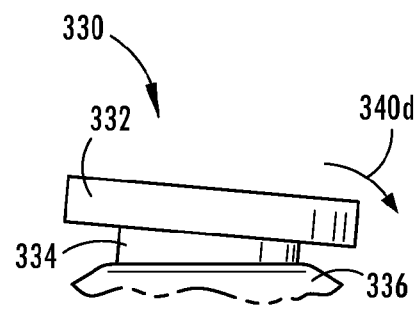

As shown in FIGS. 12-14, in another embodiment, a knob 330 or at least control element 332 can be tilted to make selections, including the above described selections of the trailer backup assist mode and various parking assist modes. Such tilting may be in a plurality of constrained tilt directions 340a, 340b, 340c, and 340d, respectively corresponding to the above-described trailer backup assist mode, parallel-park assist mode, park-out mode, and perpendicular-park assist mode. In one example, knob 330 can be mounted to console 108 by an extension element 334 that coupled within console 108 at an interface 336 therebetween that can include electronic circuitry, such as in the form of internal contact elements. The electronic circuitry is configured to transmit a signal to the appropriate controller, such as controller 28, for example, upon tilting of knob 330 in one of the above-mentioned tilt directions 340a, 340b, 340c, and 340d. In one example, the tilting movement of knob 330 can be spring biased toward the center (i.e. un-tilted) position and the tilting movement thereof can be constrained to within the described directions 340a, 340b, 340c, and 340d.

In various aspects, the tilting of knob 330 can be used for additional menu navigation and/or selection.

Figure 15:
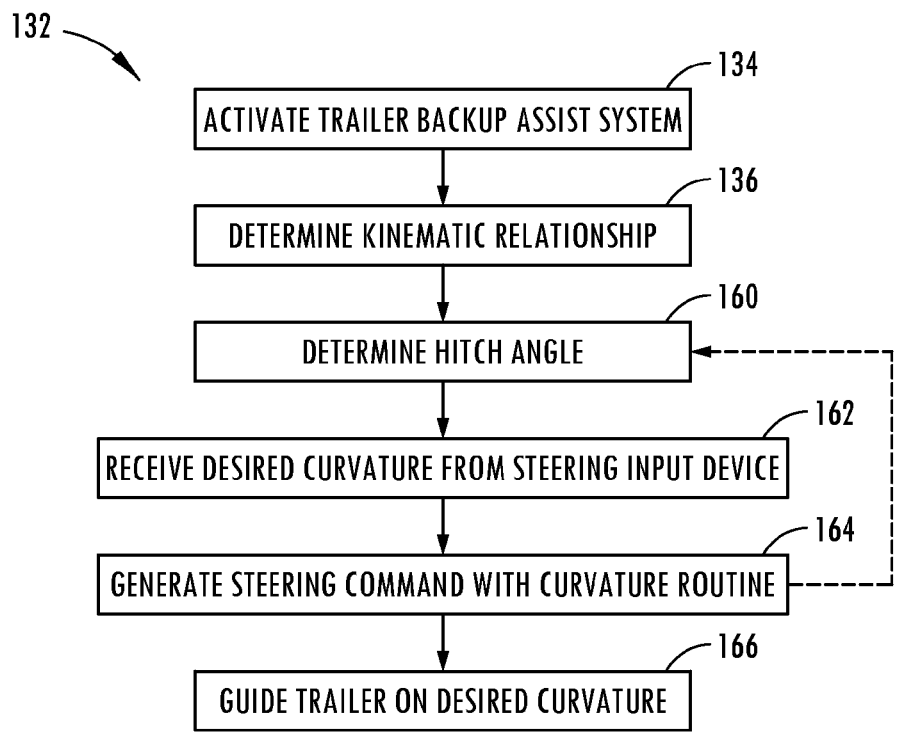
FIG. 15 is a flow diagram illustrating a method of estimating a hitch angle using a hitch angle estimation routine.

With reference to FIG. 15, a method of operating one embodiment of the trailer backup assist system 10 is illustrated, shown as one embodiment of the operating routine 132 (FIG. 2). At step 134, the method is initiated by the trailer backup assist system 10 being activated, such as by a user depressing button 240a of a knob 230 according to FIG. 8 or tilting a knob 330 in direction 340a corresponding to a trailer backup initiation request. It is further contemplated that system 10 may be activated in a variety of other ways, such a making navigating through a menu sequence on display 82 of the vehicle HMI 80 and confirming an initiation of the routine 132 using knob 30 or 230, as discussed above. The next step 136, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle by processing the hitch angle estimation routine 130

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A control system for a vehicle, comprising:
    an input including a rotatable rotary element and a first physical mode selection device; and
    a controller:
        upon receiving a trailer backup mode command from the physical mode selection device, executing a trailer backup assist mode including interpreting a first instantaneous position of the rotary element as a trailer control commanding position and generating a vehicle steering command based thereon; and
        upon receiving a park assist mode command from the physical mode selection device, executing a parking assist mode including implementing a parking assist action corresponding to a second instantaneous position of the rotary element.

2. The control system of claim 1, wherein:
    the input apparatus further includes a mounting structure defining a surface extending outwardly from the rotary element; and
    the physical mode selection device includes a plurality of buttons positioned along the mounting structure adjacent the rotary element, a first one of the buttons transmitting a first signal to the controller corresponding to the trailer backup assist mode command and at least a second one of the buttons corresponding to the parking assist mode command.

3. The control system of claim 1, wherein the input includes a mounting structure and an extension element, wherein:
    the mounting structure extends outwardly from the rotary element;
    the rotary element is operably coupled with the mounting structure by the extension element with the extension element articulating about a tipping axis normal to a rotation axis of the rotary element, the tipping axis being disposed within the mounting structure such that the extension element is rotatable about the tipping axis from a central position to a plurality of selection positions such that the rotary element provides the first physical mode selection device.

4. The control system of claim 3, wherein an interface between the extension element and the mounting structure includes electronic circuitry therein and in communication with the controller, the electronic circuitry transmitting a first signal to the controller corresponding to the trailer backup assist mode command when the extension element is rotated into a first one of the plurality of selection positions and transmitting a second signal to the controller corresponding to the parking assist mode command when the extension element is rotated into a second one of the plurality of selection positions.

5. The control system of claim 1, wherein:
    the trailer control commanding position corresponds to one of a zero curvature position or at least two directional curvature positions opposed about the zero curvature position; and
    the rotary element is biased toward an at rest position corresponding to the zero curvature position.

6. The control system of claim 5, wherein the vehicle steering command is further based on a trailer curvature path corresponding to an instantaneous one of the zero curvature position or one of the at least two directional curvature positions.

7. The control system of claim 1, wherein the parking assist mode includes at least one of a perpendicular park assist mode, a parallel park assist mode and a park-out assist mode.

8. The control system of claim 1, wherein:
    the instantaneous position corresponds to one of a driver side of the vehicle, a passenger side of the vehicle, or an at rest position;
    the selection command is interpreted as a driver side selection command when the instantaneous position corresponds to the driver side of the vehicle and as a passenger side selection command when the instantaneous position corresponds to the passenger side of the vehicle; and
    the parking assist action is implemented on a side of the vehicle corresponding to the selection command.

9. A vehicle, comprising:
    a steering system;
    an input including a rotatable element and a physical mode selection device;
    a trailer backup assist system activating upon receiving a trailer backup mode command from the physical mode selection device and determining a first instantaneous position of the rotary element and executing a trailer backup assist mode including interpreting the first instantaneous position as a trailer control commanding position and outputting a steering command based thereon to the steering system; and
    a park assist system activating upon receiving a park assist mode command from the physical mode selection device and determining a second instantaneous position of the rotary element and implementing a parking assist action corresponding to the second instantaneous position including controlling the steering system.

10. The vehicle of claim 9, further comprising a console including a mounting structure defining a surface extending outwardly from the rotary element, wherein:
    the physical mode selection device includes a plurality of buttons positioned along the mounting structure adjacent the rotary element, a first one of the buttons transmitting a first signal to the controller corresponding to a request to activate the trailer backup assist system and at least a second one of the buttons transmitting a signal corresponding to a request to activate the parking assist system.

11. The vehicle of claim 9, further comprising a central console including a mounting structure extending outwardly from the rotary element, wherein:
    the input further includes an extension element operably coupling the rotary element with the mounting structure and articulating about a tipping axis normal to a rotation axis of the rotary element from a central position to a plurality of selection positions such that the rotary element provides the first physical mode selection device;

the input is further in communication with the trailer backup assist system and the park assist system for transmitting a first signal to the backup assist system corresponding to the trailer backup assist mode command when the extension element is articulated into a first one of the plurality of selection positions and transmitting a second signal to the park assist system corresponding to the parking assist mode command when the extension element is articulated into a second one of the plurality of selection positions.

12. The vehicle of claim 9, wherein:

the trailer control commanding position corresponds to one of a zero curvature position or at least two directional curvature positions opposed about the zero curvature position; and the rotary element is biased toward an at rest position corresponding to the zero curvature position.

13. The vehicle of claim 12, wherein the steering command is further based on a trailer curvature path corresponding to an instantaneous one of the zero curvature position or one of the at least two directional curvature positions.

14. The vehicle of claim 9, wherein the parking assist action includes at least one of a perpendicular park assist action, a parallel park assist action and a park-out assist action.

15. The vehicle of claim 9, wherein:

the second instantaneous position corresponds to one of a driver side of the vehicle, a passenger side of the vehicle, or an at rest position;

the selection command is interpreted as a driver side selection command when the instantaneous position corresponds to the driver side of the vehicle and as a passenger side selection command when the instantaneous position corresponds to the passenger side of the vehicle; and the parking assist action is implemented on a side of the vehicle corresponding to the passenger side selection command.

16. A method for controlling a vehicle, comprising:

receiving a first mode input from a physical mode selection device within the vehicle;

when the first mode input is a backup assist initiation command, determining a first instantaneous position of a rotary element within the vehicle, interpreting the first instantaneous position as a trailer control position, and controlling a vehicle steering system to guide the vehicle along a backing path determined using the trailer control position; and when the first mode input is a park assist initiation command, implementing a parking action on a side of the vehicle corresponding to the first instantaneous position.

17. The method of claim 16, wherein the physical mode selection device is a plurality of buttons adjacent the rotary element, a first one of the buttons corresponding to the backup assist initiation command and at least a second one of the buttons corresponding to the park assist initiation command.

18. The method of claim 16, wherein the physical mode selection device is electronic circuitry within an interface between a mounting structure and an extension element operably coupling the mounting structure with the rotary element, the electronic circuitry transmitting a first signal corresponding to the trailer backup assist mode command when the extension element is articulated into a first one of a plurality of selection positions and transmitting a second signal corresponding to the parking assist mode command when the extension element is articulated into a second one of the plurality of selection positions.

19. The method of claim 16, wherein:

the trailer control position corresponds to one of a zero curvature position or at least two directional curvature positions opposed about the zero curvature position; and the steering command is further based on a trailer curvature path corresponding to an instantaneous one of the zero curvature position or one of the at least two directional curvature positions.

20. The method of claim 16, wherein:

the first instantaneous position corresponds to one of a driver side of the vehicle, a passenger side of the vehicle, or an at rest position;

the first mode input is interpreted as a driver side selection command when the instantaneous position corresponds to the driver side of the vehicle and as a passenger side selection command when the instantaneous position corresponds to the passenger side of the vehicle; and the parking action is implemented on a side of the vehicle corresponding to the instantaneous position.

* * * * *